(12) United States Patent
Yamauchi et al.

(10) Patent No.: US 7,704,478 B2
(45) Date of Patent: Apr. 27, 2010

(54) METHOD AND APPARATUS FOR REFINING SILICON USING AN ELECTRON BEAM

(76) Inventors: Norichika Yamauchi, 864-3-205 Yawata, Ichihara, Chiba 290-0062 (JP); Takehiko Shimada, 46-1 Sakuradai, Aoba-ku, Yokohama, Kanagawa 227-0061 (JP); Minoru Mori, 4-27-32-203 Ikejiri, Setagaya-ku, Tokyo 154-0001 (JP)

( * ) Notice: Subject to any disclaimer, the term of this patent is extended or adjusted under 35 U.S.C. 154(b) by 711 days.

(21) Appl. No.: 11/483,187

(22) Filed: Jul. 10, 2006

(65) Prior Publication Data
US 2007/0077191 A1    Apr. 5, 2007

(30) Foreign Application Priority Data
Aug. 16, 2005    (JP)    ............... 2005-264309

(51) Int. Cl.
*C01B 33/02*    (2006.01)
(52) U.S. Cl. .............. 423/348; 423/343; 423/349; 423/279; 423/282; 423/350; 422/188; 422/255
(58) Field of Classification Search .............. None
See application file for complete search history.

(56) References Cited
U.S. PATENT DOCUMENTS 5,961,944 A * 10/1999 Aratani et al. ............... 423/348

6,114,808 A * 9/2000 Takahashi .................. 315/3.5
6,231,826 B1 * 5/2001 Hanazawa et al. .......... 423/348

FOREIGN PATENT DOCUMENTS

JP    10245216    9/1998

* cited by examiner

*Primary Examiner*—Melvin C Mayes
*Assistant Examiner*—Smita Patel
(74) *Attorney, Agent, or Firm*—Michael Tobias

(57) ABSTRACT

A method and apparatus for refining silicon which can remove impurity elements such as phosphorus and antimony as well as impurity elements such as boron and carbon using an electron beam in the same vacuum chamber are provided. Silicon is irradiated and melted with an electron beam in a low vacuum inside a vacuum vessel, a compound-forming substance such as $H_2O$ which reacts with boron or the like in the molten silicon and forms a vaporizable oxide is introduced into the vacuum chamber, and impurity elements such as boron having a low vapor pressure in a vacuum are evaporated from the molten silicon as part of the vaporizable compound. Silicon in the vacuum vessel is then irradiated with an electron beam in a high vacuum in the vacuum vessel, and impurity elements contained in the silicon having a high vapor pressure in a vacuum such as phosphorus are removed.

12 Claims, 6 Drawing Sheets

F I G. 1
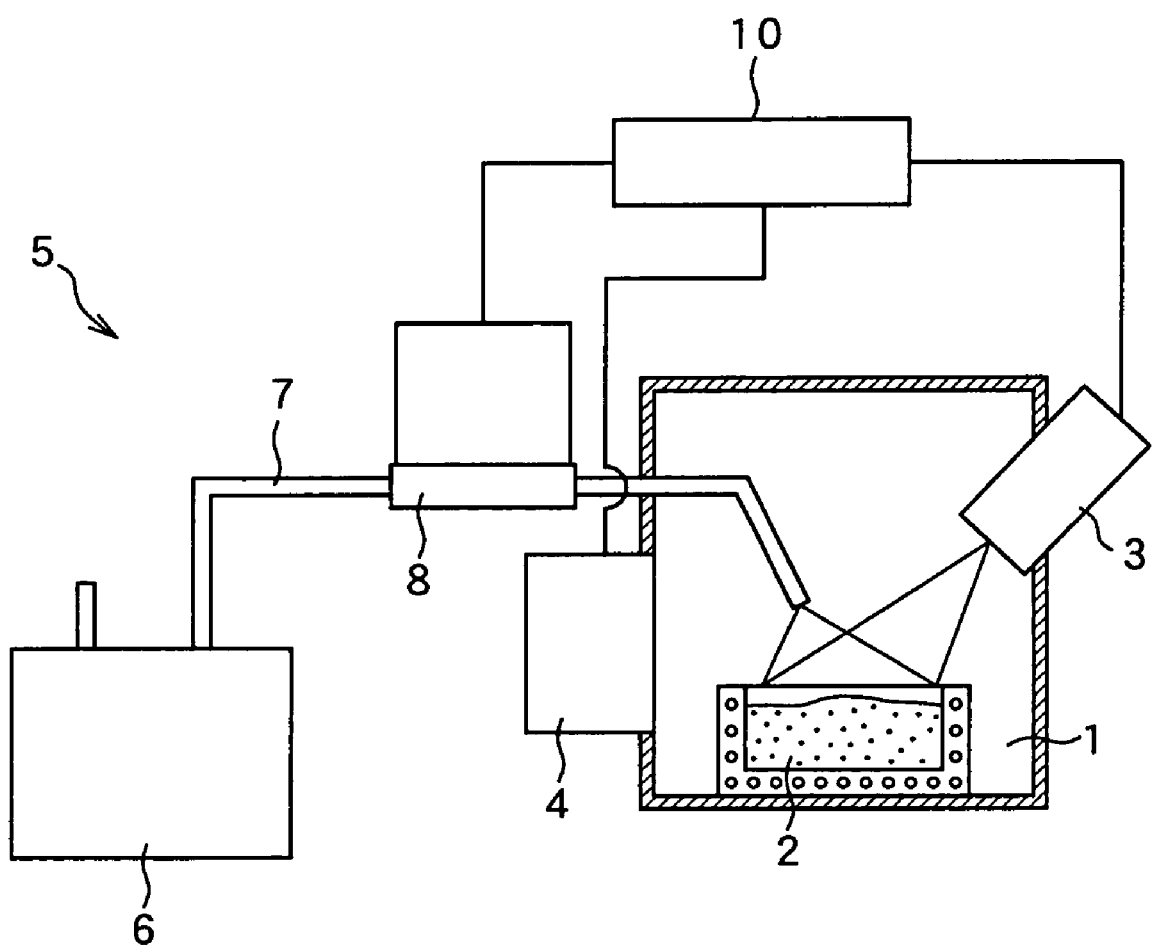

F I G. 4
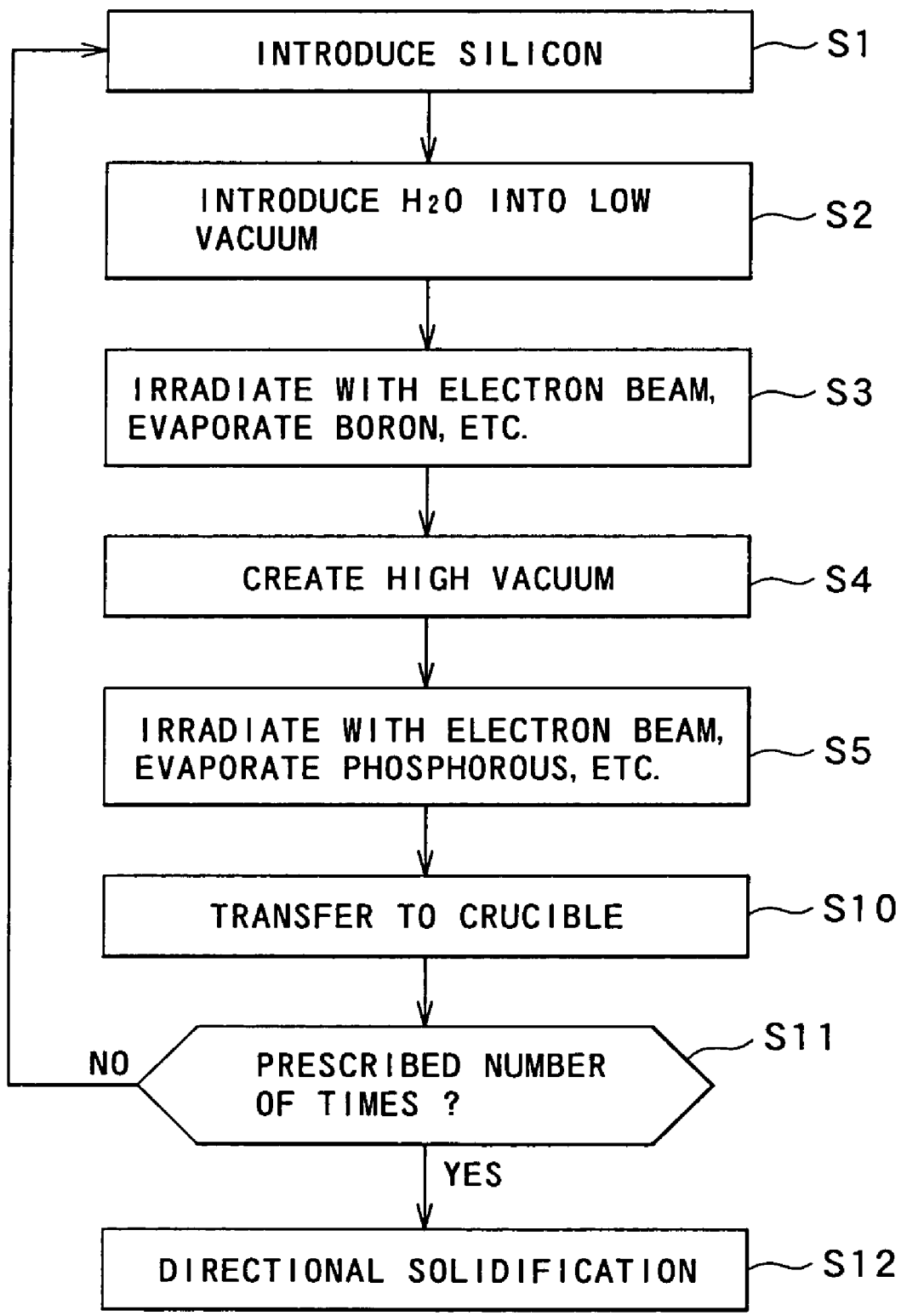

F I G. 6
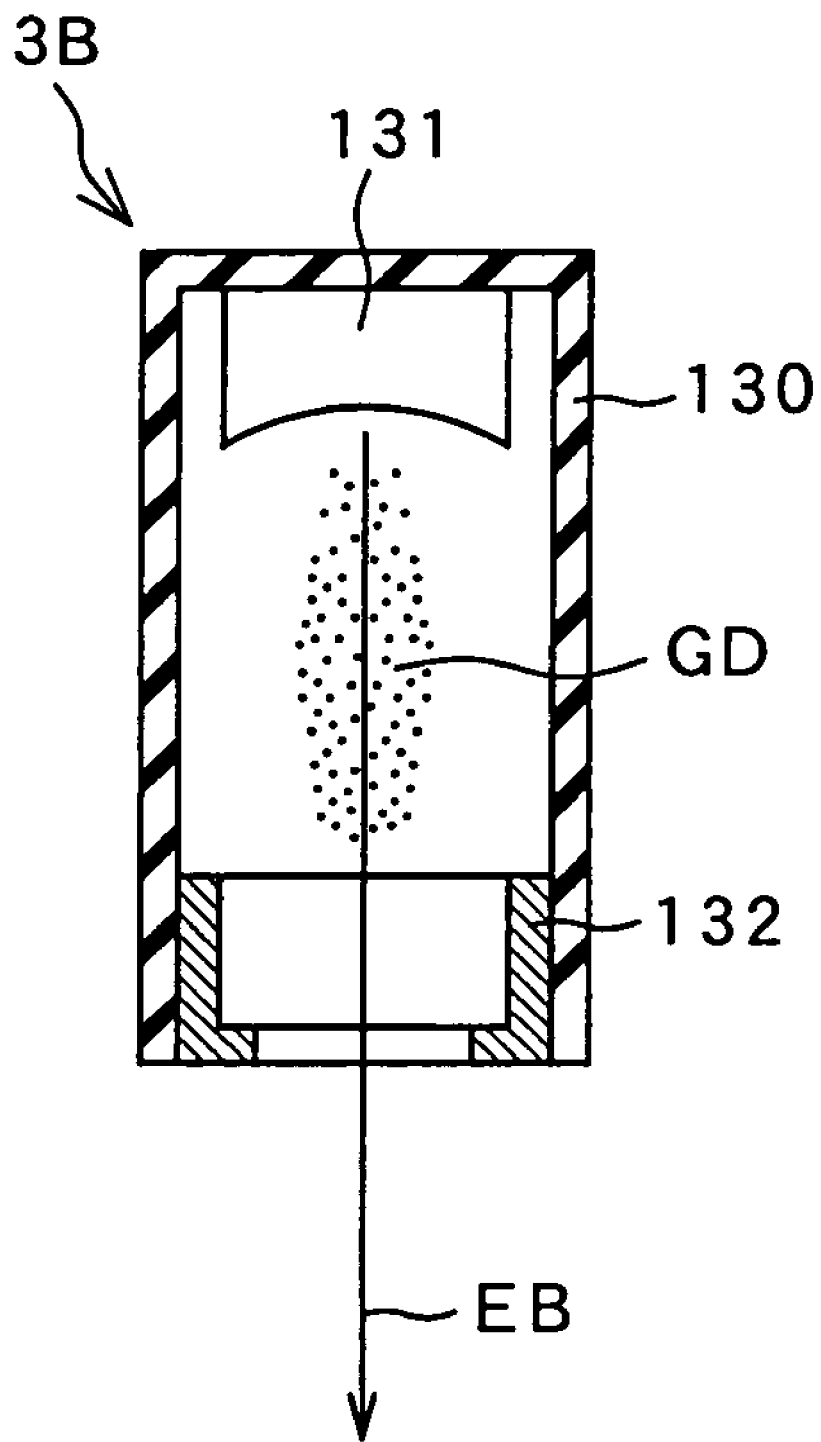

METHOD AND APPARATUS FOR REFINING SILICON USING AN ELECTRON BEAM

BACKGROUND OF THE INVENTION

This invention relates to a method and apparatus for refining silicon containing impurity elements such as metallurgical grade silicon using an electron beam and obtaining high purity silicon for use in solar cells or other semiconductor devices, for example.

Metallurgical grade silicon, which is a starting material for manufacture of high purity silicon, is obtained by reducing quartzite. The degree of purity of metallurgical grade silicon is too low for it to be used as is for the manufacture of semiconductors, and it cannot even be used without further refining as silicon for the manufacture of solar cells (referred to as solar grade silicon), which has a lower purity than silicon for manufacture of semiconductors.

The primary impurities in metallurgical grade silicon are metals. These impurities can be removed by the physical method of directional solidification. The remaining impurities are primarily boron and phosphorus, which cannot be removed so easily. Therefore, in the past, metallurgical grade silicon has typically been refined by chemical methods, such as the Siemens method, which forms extremely high purity silicon referred to as polycrystalline silicon or polysilicon. Polysilicon has a sufficient purity for use in semiconductors, but such a high purity is not required for solar grade silicon. Accordingly, there is a desire for a simpler method of refining silicon to obtain higher grades of silicon, such as solar grade silicon.

Japanese Published Unexamined Patent Application Hei 10-245216 discloses a method and apparatus for producing solar grade silicon using a metallurgical process rather than a chemical process. The method disclosed in that patent document takes into consideration three types of impurity elements contained in metallurgical grade silicon, i.e., impurity elements such as phosphorus and antimony which can be evaporated by irradiation with an electron beam in a vacuum and removed, impurity elements such as boron and carbon which can be evaporated and removed by oxidation with an oxidizing gas (such as water vapor) which is added to a high temperature plasma gas stream, and metallic impurity elements which can be removed by directional solidification. In the method disclosed in that document, these different groups of impurity elements are removed by separate procedures.

In the conventional method for refining silicon disclosed in the above-described patent document, it is necessary to carry out removal of impurity elements such as phosphorus and antimony and removal of impurity elements such as boron and carbon in separate atmospheres. Namely, particles of metallurgical grade silicon are irradiated and melted with an electron beam in a first vacuum chamber to remove impurity elements such as phosphorus and antimony, lumps of silicon resulting when the molten silicon solidifies are pulverized to form silicon particles, the silicon particles are moved to a second vacuum chamber, the silicon particles are melted by a high temperature plasma gas stream, and impurity elements such as boron and carbon are oxidized and removed by an oxidizing gas added to the plasma gas stream.

Accordingly, in the above-described conventional method for refining silicon, two vacuum chambers are necessary as well as an electron gun for melting silicon and an apparatus for generating a plasma gas. As a result, a refining apparatus used for that method becomes extremely large and expensive. In addition, between the two removal processes, it is necessary to grind lumps of silicon and transport the ground silicon between the two vacuum chambers, so the efficiency of that method is poor.

SUMMARY OF THE INVENTION

The present invention provides a method and apparatus for refining silicon which can remove both impurity elements such as phosphorus and antimony having a vapor pressure in a vacuum which is higher than that of silicon (referred to below as a first group of impurity elements) and impurity elements such as boron and carbon having a vapor pressure in a vacuum which is lower than or of the same order as that of silicon (referred to below as a second group of impurity elements) in a single vacuum chamber using an electron beam.

In a method according to the present invention, raw material silicon is supplied to a melting vessel which is inside a vacuum vessel, and then the raw material silicon is refined in the vacuum vessel in several stages. In one stage, at least one impurity element selected from a first group of impurity elements such as phosphorus and antimony having a higher vapor pressure than silicon is removed from molten silicon in the melting vessel by evaporation in a high vacuum environment (such as $10^{-3}$-$10^{-4}$ Pa). In another stage, at least one impurity element selected from a second group of impurity elements such as boron and carbon having a vapor pressure which is of the same order or lower than that of silicon is removed from molten silicon in the melting vessel by introducing into the vacuum vessel a compound-forming substance which can react with the at least one impurity element such as boron or carbon to form a vaporizable compound, reacting the compound-forming substance with the at least one impurity element in molten silicon, and evaporating the vaporizable compound from the molten silicon. The order in which these stages are performed does not matter. The molten silicon is formed by irradiating raw material silicon which was introduced into the vacuum vessel with an electron beam. After refining in these two stages is completed, the molten silicon is solidified.

The molten silicon may be solidified in the melting vessel, but for greater efficiency, it is preferably transferred from the melting vessel to a solidification vessel in the form of a crucible which is disposed next to the melting vessel and solidified in the crucible. Transfer of molten silicon into the crucible enables raw material silicon to then again be introduced into the melting vessel. The crucible is heated so as to maintain all of the silicon in the crucible in a molten state. When the amount of molten silicon in the crucible reaches a prescribed level, the molten silicon is slowly cooled in the crucible and solidified so that impurities contained anywhere in the molten silicon move upward. In this manner, directional solidification can be carried out.

In order to evaporate and remove impurity elements from silicon using an electron beam, a high vacuum environment (such as $10^{-1}$ Pa) was normally considered necessary. For this reason, there have not been many attempts at melting by electron beam irradiation under a low vacuum. In addition, a high vacuum ($10^{-1}$-$10^{-2}$ Pa) is necessary in order to operate a typical electron gun. Therefore, it has been thought impossible to introduce a compound-forming substance, which reduces the vacuum, into a vacuum chamber for evaporative removal with an electron beam of impurity elements such as boron having a relatively low vapor pressure compared to silicon.

The reason why a high vacuum is typically required for operating an electron gun is because most electron guns employ a hot cathode in which electrons are generated by thermionic emission by a metal heated to a high temperature, and a high vacuum is required to prevent damage to the hot cathode. The present inventors realized that if an electron gun employing differential pumping or an electron gun which does not rely on thermionic emissions is used to generate an electron beam, an electron beam can be generated even when not maintaining a high vacuum in a vacuum vessel such as has conventionally been required. As a result, molten silicon can be melted with an electron beam to remove impurities even in a low vacuum environment on the order of 1-100 Pa which exists when a compound-forming substance is introduced into a vacuum chamber.

Thus, a method of refining silicon using an electron beam according to one form of the present invention includes introducing silicon to be refined into a vacuum chamber, establishing a first vacuum in the vacuum chamber, irradiating the silicon with an electron beam to form molten silicon, evaporating at least one element selected from a first group of impurity elements having a vapor pressure in a vacuum higher than that of silicon from the molten silicon while irradiating the molten silicon with an electron beam, establishing a second vacuum in the vacuum chamber which is lower than the first vacuum, introducing a compound-forming substance which reacts with at least one element in the molten silicon selected from a second group of impurity elements having a vapor pressure in a vacuum which is of the same order or lower than that of silicon into the vacuum chamber, reacting the compound-forming substance with the at least one element selected from the second group of impurity elements to form a vaporizable compound, and evaporating the compound from the molten silicon while irradiating the molten silicon with an electron beam.

Irradiation with an electron beam in order to evaporate at least one element selected from the first group of impurity elements and irradiation with an electron beam in order to evaporate the vaporizable compound containing at least one element selected from the second group of impurity elements are preferably carried out using the same electron gun. When using the same electron gun for both purposes, the electron gun is preferably one which can be operated in both a low vacuum environment and a high vacuum environment, since the vacuum chamber is maintained at different vacuums at different stages of refining.

The term electron gun here refers to any type of device capable of generating an electron beam capable of melting raw material silicon in a vacuum vessel. When the electron gun is a hot cathode electron gun, it preferably employs differential pumping to enable the interior of the vacuum chamber to be set to a low vacuum (such as 1-100 Pa) suitable for the introduction of the compound-forming substance while enabling the cathode to be maintained at a high vacuum which preserves the life of the cathode. Alternatively, the electron gun may be a cold cathode glow discharge electron gun which can be operated over a wide range of vacuums without damage to the cathode.

A hot cathode electron gun refers to an electron gun in which a cathode is heated to produce thermionic emission of electrons. A cold cathode electron gun is one which does not rely upon thermionic emissions from a heated cathode to produce electrons. In a cold cathode glow discharge electron gun, a voltage is applied between a cold cathode and an anode to cause a glow discharge in a gaseous ionizable medium between the anode and the cathode, and ions from the glow discharge collide with the cathode, causing the cathode to emit electrodes. An electron gun which employs differential pumping is equipped with a partition having a minute aperture which is large enough for an electron beam to pass through but small enough to enable different vacuum levels to exist on opposite sides of the partition. By connecting a vacuum pump to the interior of the electron gun on one side of the partition, the interior of the electron gun can be maintained at a higher vacuum than the exterior of the electron gun, thereby enabling the electron gun to operate in a vacuum chamber containing a low vacuum. Each of the above-described types of electron guns is well known in the art and extensively described in scientific literature.

The method preferably further includes carrying out directional solidification of molten silicon after removal of impurity elements by evaporation such that metal elements in the molten silicon aggregate at one end of a lump of silicon which is obtained by solidification, and cutting off the end portion of the lump of silicon where the metal elements have aggregated. These steps enable metal impurity elements in the silicon to be removed.

An apparatus for refining silicon using an electron beam according to another form of the present invention includes a vacuum chamber, a melting vessel disposed installed inside the vacuum chamber for holding silicon to be refined, a first electron gun capable of irradiating silicon in the first melting vessel with an electron beam and melting the silicon, a vacuum pump which is connected to the vacuum chamber and which can be adjusted to form a high vacuum on the order of $10^{-1}$-$10^{-4}$ Pa and a low vacuum on the order of 1-100 Pa in the vacuum chamber, and a supply mechanism connected to the vacuum chamber to supply to the interior of the vacuum chamber a compound-forming substance which can react with an element in molten silicon having a vapor pressure lower than or of the same order as that of silicon to form a vaporizable compound.

The refining apparatus may further include a solidification vessel which is disposed next to the melting vessel and to which silicon which is melted in the first melting vessel can be transferred for solidification. It may also include a second electron gun which can irradiate silicon which was transferred to the solidification vessel with an electron beam in order to maintain it in a molten state.

The first group of impurity elements comprises phosphorus, arsenic, and antimony, and the second group of impurity elements comprises boron and carbon. An example of the compound-forming substance which is capable of reacting with an element of the second group of impurity elements to form a vaporizable compound is $H_2O$, in which case the vaporizable compound is an oxide.

According to the present invention, at least one element selected from a first group of impurity elements such as phosphorus and antimony and at least one element selected from a second group of impurity elements such as boron and carbon can both be removed from silicon inside the same vacuum chamber using an electron beam, so not only can a refining apparatus according to the present invention be greatly reduced in size, its operating efficiency can also be increased.

"Raw material silicon" refers to any type of silicon to be refined by the present invention. It is not restricted to any particular type of silicon. Typically the raw material silicon will be metallurgical grade silicon. However, other grades of silicon can also be used as the raw material silicon, such as scrap silicon formed during the manufacture of semiconductors.

BRIEF DESCRIPTION OF THE DRAWINGS

FIG. 1 is a schematic view showing the overall structure of an embodiment of a silicon refining apparatus according to the present invention.

FIG. 4 is a flow chart showing an embodiment of a refining method for silicon using the refining apparatus of FIG. 3.

FIG. 6 is a schematic view showing the configuration of an example of a cold cathode glow discharge electron gun.

DESCRIPTION OF PREFERRED EMBODIMENTS

Figure 2:
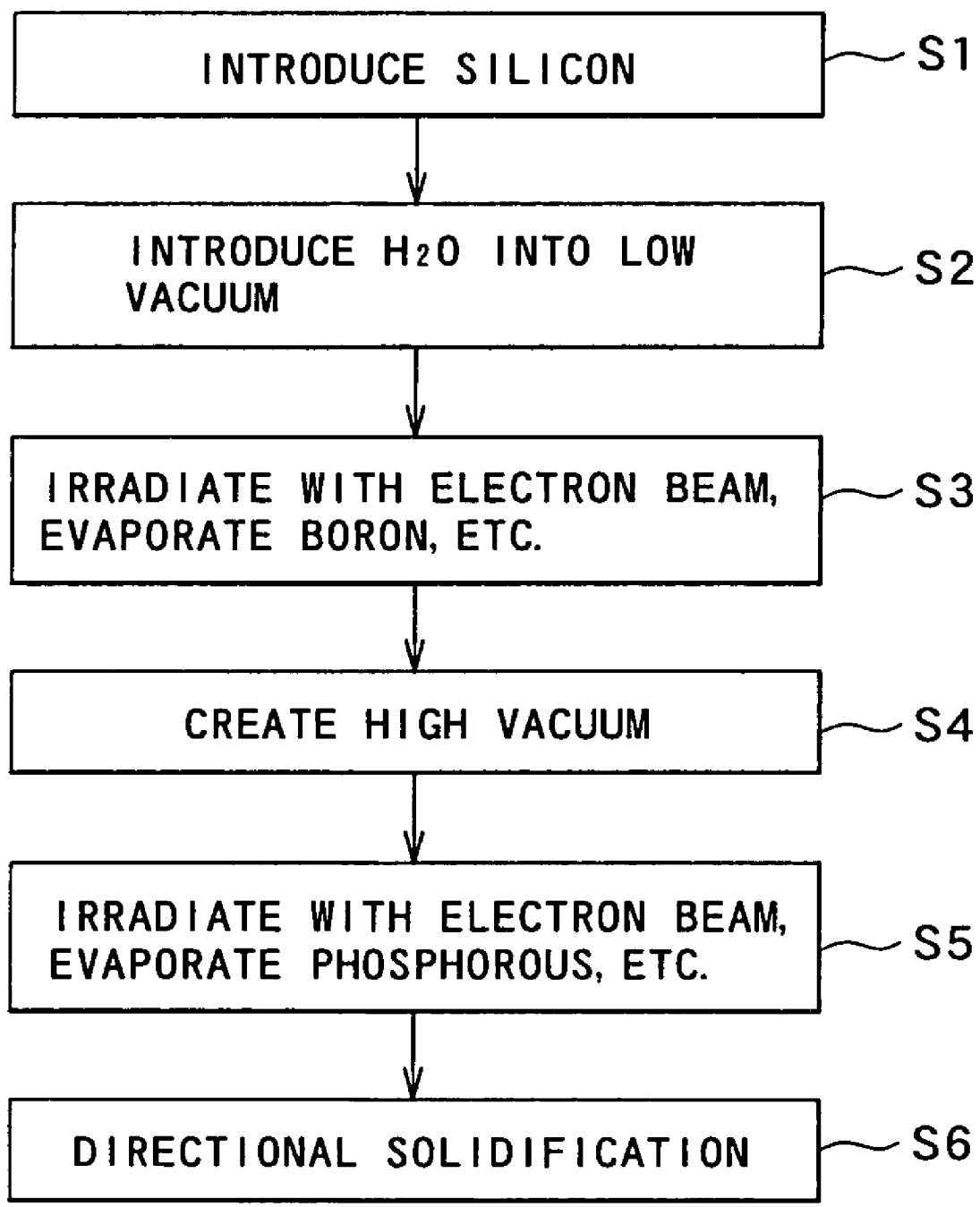
FIG. 2 is a flow chart showing an embodiment of a refining method for silicon using the refining apparatus of FIG. 1.

Below, embodiments of a refining apparatus for silicon using an electron beam according to the present invention and a refining method using the refining apparatus will be described while referring to the accompanying drawings.

As shown in FIG. 1, a first embodiment of a silicon refining apparatus using an electron beam according to the present invention includes a vacuum vessel (a vacuum chamber) 1, a melting vessel 2 which is installed inside the vacuum vessel 1 and to which crushed pieces of raw material silicon in the form of metallurgical grade silicon are supplied, an electron gun 3 which irradiates the raw material silicon inside the melting vessel 2 with an electron beam and melts it, a vacuum pump system 4 which maintains a vacuum inside the vacuum vessel 1, and an $H_2O$ introducing system 5 which introduces $H_2O$ as a compound-forming substance into the vacuum vessel 1 in the form of a mist, for example.

Figure 5:
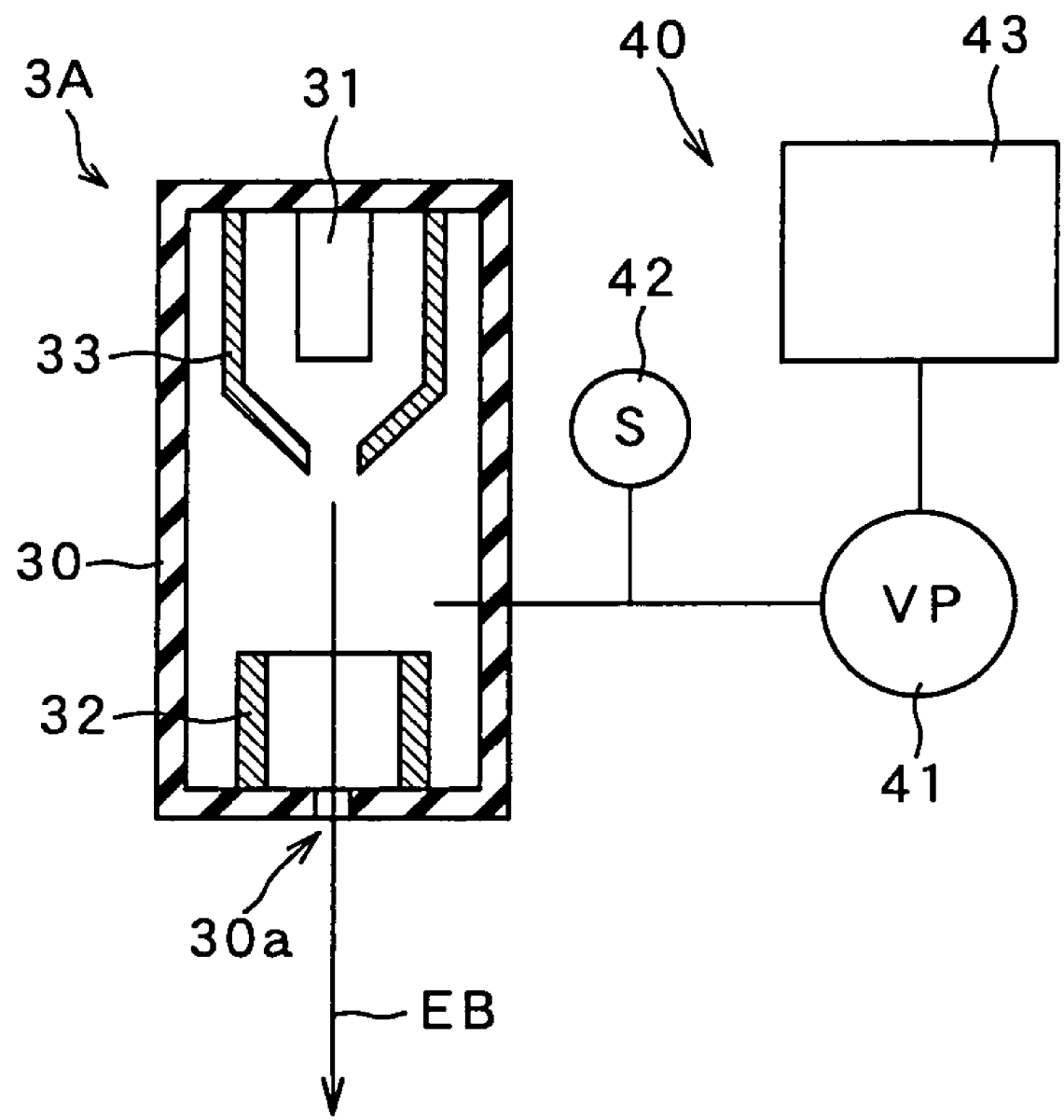
FIG. 5 is a schematic view showing the configuration of an example of a hot cathode electron gun employing differential pumping.

The electron gun 3 is preferably either a hot cathode electron gun employing differential pumping or a cold cathode glow discharge electron gun. FIG. 5 schematically shows the configuration of an example of a hot cathode electron gun 3A employing differential pumping, and FIG. 6 schematically shows the configuration of an example of a cold cathode glow discharge electron gun 3B.

The hot cathode electron gun 3A of FIG. 5 includes a cylindrical housing 30 formed of an electrically insulating material, a cylindrical cathode 31 containing an unillustrated heater, a cylindrical anode 32, and a Wehnelt electrode 33. The cathode 31 is disposed at the upper end of the inside the housing 30, and the anode 32 is disposed at the lower end of the inside the housing 30. The Wehnelt electrode 33 is disposed between the cathode 31 and the anode 32. When a high voltage is applied between the cathode 31 and the anode 32 and a bias voltage is applied to the Wehnelt electrode 33, an electron beam EB is generated. A small opening 30a is formed in the lower end wall of the housing 30 so as to allow passage of the electron beam EB therethrough. The opening 30a is sufficiently small that it enables the interior and the exterior of the housing 30 to be at different vacuums. A differential pumping system 40 is connected to the electron gun 3A. The differential pumping system 40 includes a vacuum pump 41, a vacuum sensor 42, and a controller 43 for operating the vacuum pump 41 such that the vacuum sensed by the vacuum sensor 42 coincides with a target vacuum suitable for operation of the electron gun 3A. The differential pumping system 40 enables the interior of the housing 30 to be maintained at the target vacuum irrespective of the vacuum inside the vacuum vessel 1.

The cold cathode glow discharge electron gun 3B of FIG. 6 includes a cylindrical housing 130 formed of an electrically insulating material, a cylindrical cold cathode 131 having a concave front face, and a cylindrical anode 132. The cathode 131 is disposed inside the housing 130 at its upper end, and the anode 132 is disposed inside the housing 130 at its lower end. When a high voltage is applied between the cathode 131 and the anode 132, a glow discharge GD occurs between the cathode 131 and the anode 132. The ions from the glow discharge collide with the cathode 131 when the cathode 131 has a negative potential relative to the anode 132, and electrons are emitted by the cathode 131. Due to the shapes of the cathode 131 and the anode 132 and the shape of the electric field therebetween, the emitted electrons are formed into an electron beam EB.

In this embodiment, the electron gun 3 is a cold cathode glow discharge electron gun. One example of a cold cathode glow discharge gun which is suitable for use in the present invention is one available from Kiev Polytechnical Institute (Kiev, Ukraine). This model has an adjustable output and can be operated in a wide range of vacuums (from a low vacuum of around 1-100 Pa to a high vacuum of $10^{-3}$-$10^{-4}$ Pa). However, the present invention is not restricted to any particular make or model of electron gun.

The vacuum pump system 4 may be of conventional structure. It is typically equipped with a vacuum pump which communicates with the interior of the vacuum vessel 1 and a vacuum sensor which senses the degree of vacuum in the vacuum chamber 1. The output of the vacuum sensor is input to a controller 10, which controls the vacuum pump of the vacuum pump system 4 in accordance with the vacuum sensed by the vacuum sensor so as to maintain a target vacuum within the vacuum chamber 1. In response to a command from the controller 10, the vacuum pump system 4 can be switched between a high vacuum (such as $10^{-3}$-$10^{-4}$ Pa) suitable for evaporative removal of a first group of impurity elements having a high vapor pressure in a vacuum such as phosphorus and a low vacuum (such as 1-10 Pa) suitable for evaporative removal of a second group of impurity elements such as boron or carbon which react with $H_2O$ (i.e., oxidize) and form a vaporizable compound.

The $H_2O$ introducing system 5 includes a water vapor generating apparatus 6, a water vapor supply pipe 7 which leads water vapor which is formed in the water vapor generating apparatus 6 to the vacuum vessel 1, and a mass flow controller 8 which is installed along the water vapor supply pipe 7. The mass flow controller 8 continuously or intermittently supplies water vapor to the vacuum vessel 1 based on a command from the controller 10 and controls the flow rate of water vapor to the vacuum vessel 1. The water vapor generating apparatus 6 includes a container for water and a heater for heating water in the container so as to generate water vapor. The mass flow controller 8 may be a commercially available product.

The controller 10 may comprise a conventional sequence controller, a microcomputer, or similar mechanism for controlling the refining process performed by the refining apparatus. As shown in FIG. 1, the electron gun 3 and the mass flow controller 8 of the $H_2O$ introducing system 5 are connected to the controller 10. Although not shown in the drawing, the vacuum pump system 4 is also connected to the controller 10. The electron gun 3, the mass flow controller 8, and the vacuum pump system 4 are operated in accordance with commands from the controller 10.

The operation of the embodiment of a refining apparatus according to the present invention shown in FIG. 1 will next be described while referring to the flow chart of FIG. 2. First, an operator of the refining apparatus opens an unillustrated lid of the vacuum vessel 1 and introduces raw material silicon into the melting vessel 2 (Step S1). Then, the operator closes the lid and presses a start button connected to the controller 10. This causes the controller 10 to initiate a refining process. First, the controller 10 operates the vacuum pump system 4 and creates an atmosphere with a prescribed low vacuum of 1-10 Pa, and it operates the mass flow controller 8 of the $H_2O$ introducing system 5 to supply a prescribed amount of water vapor to the inside of the vacuum vessel 1. Preferably, the flow rate and velocity of the water vapor are determined such that at least a surface portion of the molten silicon is agitated, preferably vigorously. Accordingly, the water vapor supply pipe 7 is preferably disposed such that the end from which water vapor is discharged is located near the surface of the molten silicon. After the introduction of $H_2O$, the vacuum pump system 4 automatically adjusts the vacuum so as to maintain the vacuum at the prescribed level of 1-10 Pa (Step S2). The controller 10 then operates the electron gun 3 so as to irradiate raw material silicon in the melting vessel 2 with an electron beam and melt it (Step S3). As a result, at least one element selected from the second group of impurity elements such as boron and carbon which moves to the surface of the molten silicon due to convection is oxidized and forms an oxide. The vapor pressure in a vacuum of the oxide is higher than that of silicon, so the oxide evaporates from the melt and is discharged from the refining apparatus by the vacuum pump system 4. As an alternative to the above-described order of operations, the introduction of water vapor into the vacuum vessel 1 can be carried out after the start of electron beam irradiation.

Next, the controller 10 operates the vacuum pump system 4 to create a prescribed high vacuum of $10^{-3}$-$10^{-4}$ Pa in the vacuum vessel 1 (Step S4). As a result, water vapor and oxides remaining in the vacuum vessel 1 can be nearly entirely removed. The controller 10 then operates the electron gun 3 to irradiate molten silicon inside the melting vessel 2 with the electron beam (Step S5). As a result, at least one element selected from the first group of impurity elements such as phosphorus and antimony having a vapor pressure in a vacuum which is higher than that of silicon and which moves to the surface of the melt due to convection of the silicon in the melt is evaporated from the melt and discharged to the outside of the refining apparatus by the vacuum pump system 4.

The silicon from which at least one element selected from each of the first and second groups of impurity elements was removed in this manner is slowly cooled. As a result, directional solidification takes place, and metal impurity elements collect at the upper end of the resulting lump of silicon. After the lump of silicon is removed from the melting vessel 2, metal impurity elements in the lump can be removed by cutting off the upper end of the lump (Step S6).

Removal of at least one element selected from the first group of impurity elements such as phosphorus and removal of at least one element selected from the second group of impurity elements such as boron can also be carried out in the reverse order from that described above.

Figure 3:
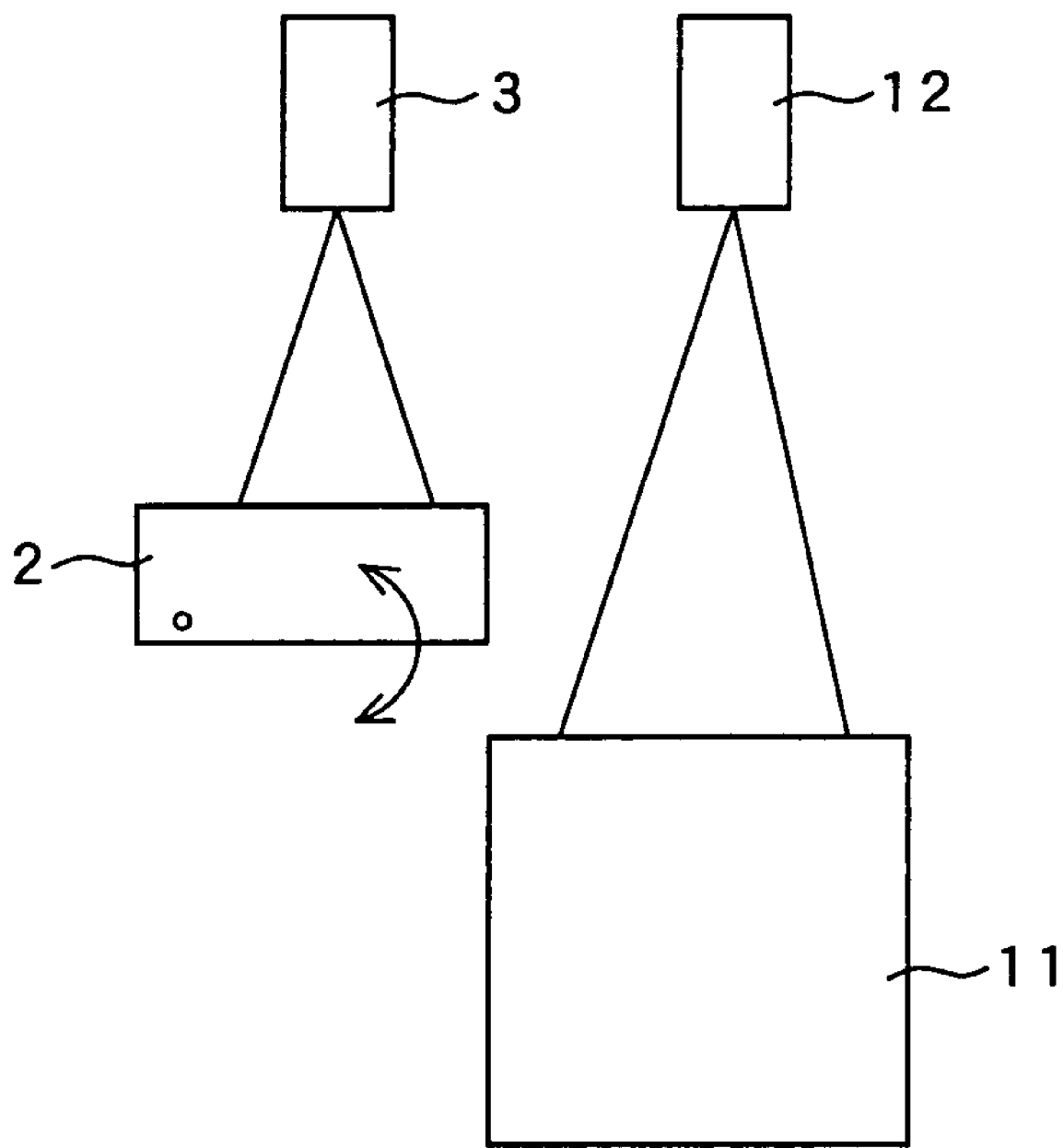
FIG. 3 is a schematic view showing a portion of another embodiment of a refining apparatus according to the present invention.

FIG. 3 illustrates a portion of another embodiment of a refining apparatus according to the present invention which makes it easier to refine a large amount of raw material silicon. In this embodiment, a solidification vessel in the form of a crucible 11 is installed next to the melting vessel 2. The melting vessel 2 is pivotably supported so as to be capable of tilting, and molten silicon in the melting vessel 2 can be transferred to the crucible 11 by tilting the melting vessel 2 and pouring molten silicon into the crucible 11. A second electron gun 12 may be provided for reheating molten silicon which was transferred from the melting vessel 2 to the crucible 11 to keep it in a molten state. The structure of this embodiment is otherwise the same as that of the embodiment of FIG. 1.

A refining method for silicon using the embodiment of FIG. 3 will be explained while referring to the flow chart in FIG. 4, which shows the steps in this method. Steps S1-S5 in FIG. 4 are the same as Steps S1-S5 in FIG. 2, so an explanation of those steps will be omitted. In Step S10, molten silicon from which impurity elements selected from the first and second groups of impurity elements were removed by the treatment up through Step S5 is transferred from the melting vessel 2 to the crucible 11 by tilting the melting vessel 2 and pouring molten silicon into the crucible 11. In Step S11, it is determined whether Steps S1-S10 have been repeated a prescribed number of times producing a prescribed level of molten silicon in the crucible 11. When they have not been repeated the prescribed number of times, Step S1 is returned to, and Steps S1-S10 are again repeated. When Steps S1-S10 have been repeated a prescribed number of times and the molten silicon in the crucible 11 has reached a prescribed level, Step S12 is performed and the second electron gun 12 is operated to reheat the molten silicon in the crucible 11, and then the molten silicon is slowly cooled. As a result, directional solidification of the molten silicon takes place, and metallic impurity elements collect at the upper end of the resulting lump of silicon. After the lump of silicon is removed from the crucible 11, the metallic impurity elements are removed by cutting off the upper end of the lump.

What is claimed is:

1. A method of refining silicon using an electron beam comprising:

introducing silicon to be refined into a vacuum chamber;

establishing a first vacuum in the vacuum chamber;

irradiating the silicon with an electron beam to form molten silicon;

evaporating at least one element selected from a first group of impurity elements having a vapor pressure in a vacuum higher than that of silicon from the molten silicon while irradiating the molten silicon with an electron beam;

establishing a second vacuum in the vacuum chamber which is lower than the first vacuum;

introducing a compound-forming substance which reacts with at least one element in the molten silicon selected from a second group of impurity elements having a vapor pressure in a vacuum which is of the same order or lower than that of silicon into the vacuum chamber;

reacting the compound-forming substance with the at least one element selected from the second group of impurity elements to form a vaporizable compound; and evaporating the vaporizable compound from the molten silicon while irradiating the molten silicon with an electron beam.

2. A method as claimed in claim 1 wherein the first group of impurity elements comprises phosphorus, arsenic, and antimony, and the second group of impurity elements comprises boron and carbon.

3. A method as claimed in claim 1 wherein the compound-forming substance is $H_2O$ and the vaporizable compound is an oxide.

4. A method as claimed in claim 1 wherein irradiation of the molten silicon to evaporate the at least one element selected from the first group of elements and irradiation of the molten silicon to evaporate the vaporizable compound is performed using the same electron gun.

5. A method as claimed in claim 4 wherein the electron gun is a cold cathode glow discharge electron gun.

6. A method as claimed in claim 1 including carrying out directional solidification of the molten silicon so that metallic elements in the molten silicon aggregate at one end of a lump of silicon obtained by solidification, and cutting off the end of the lump of silicon where the metallic elements have aggregated.

7. A method as claimed in claim 1 wherein the first vacuum is on the order of $10^{-1}$-$10^{-4}$ Pa and the second vacuum is on the order of 1-100 Pa.

8. A method as claimed in claim 1 including introducing a mist of $H_2O$ into the vacuum chamber as the compound-forming substance.

9. A method as claimed in claim 1 including agitating a surface of the molten silicon with the compound-forming substance while introducing the compound-forming substance.

10. A method of refining silicon using an electron beam comprising:

irradiating silicon in a vacuum chamber with an electron beam to form molten silicon;

irradiating the molten silicon with an electron beam while maintaining a vacuum on the order of $10^{-1}$-$10^{-4}$ Pa in the vacuum chamber to evaporate a first impurity element having a higher vapor pressure than silicon from the molten silicon;

removing the evaporated first impurity element from the vacuum chamber;

contacting a surface of the molten silicon with water vapor while maintaining a vacuum on the order of 1-100 Pa in the vacuum chamber to form an oxide of a second impurity element contained in the molten silicon, the second impurity element having a vapor pressure which is no higher than that of silicon; and removing the oxide from the vacuum chamber.

11. A method as claim in claim 10 wherein the first impurity element is selected from phosphorus, arsenic, and antimony, and the second impurity element is selected from boron and carbon.

12. A method as claim in claim 10 including irradiating the silicon in the vacuum chamber with an electron beam in the presence of the water vapor.

* * * * *